US012780735B2

(12) United States Patent
Muelas Perez

(10) Patent No.: US 12,780,735 B2
(45) Date of Patent: Nov. 3, 2026

(54) MORTAR AND CONSTRUCTION MATERIAL

(71) Applicant: Edgar Machuca Ortiz, Wellington, FL (US)

(72) Inventor: Mariano Muelas Perez, Alicante (ES)

(73) Assignee: Edgar Machuca Ortiz, Wellington, FL (US)

( * ) Notice: Subject to any disclaimer, the term of this patent is extended or adjusted under 35 U.S.C. 154(b) by 241 days.

(21) Appl. No.: 18/289,677

(22) PCT Filed: May 3, 2022

(86) PCT No.: PCT/ES2022/000021
§ 371 (c)(1),
(2) Date: Nov. 6, 2023

(87) PCT Pub. No.: WO2022/234163
PCT Pub. Date: Nov. 10, 2022

(65) Prior Publication Data

US 2024/0254049 A1 Aug. 1, 2024

(30) Foreign Application Priority Data

May 4, 2021 (ES) ................................ ES202100048

(51) Int. Cl.
*C04B 28/14* (2006.01)
*C04B 16/06* (2006.01)
(Continued)

(52) U.S. Cl.
CPC .......... *C04B 28/14* (2013.01); *C04B 16/0641* (2013.01); *C04B 16/082* (2013.01); *C04B 24/04* (2013.01); *C04B 2201/20* (2013.01)

(58) Field of Classification Search
CPC ... C04B 28/14; C04B 16/0641; C04B 16/082; C04B 24/04; C04B 2201/20;
(Continued)

(56) References Cited

U.S. PATENT DOCUMENTS 5,227,100 A 7/1993 Koslowski et al.
6,565,645 B1 * 5/2003 Klein .................. C04B 40/0039 106/781
(Continued)

FOREIGN PATENT DOCUMENTS

CN 108002793 A * 5/2018 ............. C04B 28/06
CN 211921344 11/2020
(Continued)

OTHER PUBLICATIONS

ES_2718130_A1 machine translation (cited on IDS) (Year: 2019).*
(Continued)

*Primary Examiner* — Pamela H Weiss

(74) *Attorney, Agent, or Firm* — MALLOY & MALLOY, PL

(57) ABSTRACT

The present invention relates to a mortar with a composition comprising the following components expressed in percentage by weight: 65-69% calcium sulphate; 28-33% water; and 0.01-0.1% polycarboxylic acid-based setting control additive. The invention also relates to a construction material with a composition that consists of a mortar mixture such as the aforementioned mixture and a granular material selected from among ethyl vinyl acetate, cork or marble powder. According to the invention, the construction material can be used to produce construction parts, blocks or panels, and the parts produced with said construction material can be attached to each other and/or coated with the mortar.

1 Claim, 2 Drawing Sheets

(51) Int. Cl.
*C04B 16/08* (2006.01)
*C04B 24/04* (2006.01)

(58) Field of Classification Search
CPC ............ C04B 24/2641; C04B 38/0067; C04B 24/2623; C04B 18/245; C04B 20/0076; C04B 14/285
See application file for complete search history.

(56) References Cited

U.S. PATENT DOCUMENTS

| | | | |
|---|---|---|---|
| 8,030,377 B2 | 10/2011 | Dubey et al. | |
| 9,790,703 B1 | 10/2017 | Hector, Jr. et al. | |
| 2002/0090871 A1 | 7/2002 | Ritchie et al. | |
| 2011/0154764 A1* | 6/2011 | Wang | E04C 2/288 52/309.1 |
| 2021/0053877 A1 | 2/2021 | Huang et al. | |
| 2024/0254049 A1 | 8/2024 | Muelas Perez | |

FOREIGN PATENT DOCUMENTS

| | | |
|---|---|---|
| CN | 112694343 | 6/2022 |
| ES | 2718130 | 6/2019 |
| WO | WO2022234163 | 10/2022 |
| WO | WO2026075694 | 4/2026 |

OTHER PUBLICATIONS

CN_108002793_Machine Translation (Year: 2018).*
ES2927514 Machine Translation (Cited on IDS) (Year: 2022).*
Vasconcelos et al, https://www.researchgate.net/publication/265249673, Nov. 1, 2013.

* cited by examiner

MORTAR AND CONSTRUCTION MATERIAL

FIELD OF THE INVENTION

The present invention is directed to mortar and construction materials within the construction sector, specifically included in the sector of panels, flooring, bricks, and prefabricated construction pieces.

OBJECT OF THE INVENTION

The invention is intended to improve the technical properties in the construction of panels, bricks and/or construction strips, by means of a mortar and a construction material, obtained by way of that mortar, which is ecological, manageable, and does not need anchoring structures for the union between the resulting pieces, panels or the like.

To this end, a first object of the invention is to define a new type mortar with a plaster-type conglomerate; and, in addition, a clear object of the invention is to define a construction material that comprises a mixture formed by the mortar and at least one granular material of the ethylene-vinyl acetate (hereinafter also referred to as "EVA") type, recycled cork or marble powder, so that once the mixture has set, the resulting material is suitable for construction.

DESCRIPTION OF THE RELATED ART

Currently, the most well-known and used construction materials to date for prefabricated constructions are laminated plasterboard or PYL or what is known as "PLADUR®" and specifically, the latter is made up of a laminated plasterboard located between two layers of cardboard, so its components are generally plaster and cellulose. This type of construction material is mainly used for the execution of interior partitions, ceilings and walls; and are usually used in the form of industrialized plates, panels or boards, where the assembly of these structures is carried out with the help of galvanized steel profiles or similar elements.

The present invention is based, firstly, on defining a plaster mortar, which is known to have technical characteristics that are different from cement mortars, where these plaster mortars are generally less resistant than cement mortars, although they harden more quickly. For that reason, plaster mortars are generally used to fill holes in partition walls and/or fix or join work elements; while cement mortars have better resistance characteristics and are used to raise internal partition walls.

In this sense, and as a second element of the invention, construction materials are known that are made up of a cement mortar to which granular materials different from the conventional sand itself are added, and where it is known that they additionally comprise metallic or fibrous elements.

For example, document AU1633801 is known, where a composition for a construction element based on a cement mortar is disclosed, and which may comprise EVA in powder or the form of an emulsion. This formulation additionally has other types of elements in the mixture such as citric acids or fiberglass, which allows it, in addition to having the well-known good performance once cured, to improve adhesion and early resistance compared to other materials that comprise cement mortars.

It is also known in document FR2681856 where an insulating composition is made from a cement mortar and granulated cork, and where the cork granules have a high particle size. This material does not have an acceptable resistance as a construction material, but is basically used to cover and insulate the walls, for which the granular cork material is intended to be fixed to a facing thanks to the mortar, given that the relationship between cork and cement is very unequal, 10-40% cement for 80-90% cork.

On the other hand, there are known compositions of construction materials that include plaster mortars, which, as previously mentioned, have the objective of joining constant elements, but which do not have sufficient resistant characteristics to be used to erect partitions.

In this sense, for example, what is disclosed in document WO2018032058 is known, where a panel joining element is made that comprises, among others, a plaster mortar, where among the different options it can comprise include calcium sulfate, and where the material can comprise a granular material, among the different options, of the EVA type. For this material to bind correctly, it is essential that mineral and/or synthetic fibers are included in its composition. As can also be seen in the examples, this type of material requires a very high water content in the mortar (35-42%), these percentages being higher the greater the resistance capacity achieved; and where the mortar and granular material, which may comprise EVA, has a weight ratio of 1:0'99 to 1:0'75 and, therefore, more mortar is required than granular material.

Along these lines, what is disclosed in document AU2006225280 is also known, where a material for manufacturing panels is described that comprises 40-80% by weight of mortar and 10-40% by weight of a polymeric granular material; document U.S. Pat. No. 6,355,099 where a composition is disclosed where there is a mixture by weight of mortar between 72-90% and between 9-17% of a granular material, among which EVA can be found in part; or document EP0252021A where a composition is described that comprises a mixture that, among others, comprises between 50-90% by weight of mortar, and between 5-25% by weight of a binder of ethylene copolymer powder and vinyl acetate.

Taking into account the background known in the state of the art, and knowing the problems mentioned above, the present invention below describes and justifies, on the one hand, a plaster mortar that has a composition different from those known in the state of the art, has better resistance characteristics, and can be used to erect interior partition walls without the need for additional elements, as is known to date; and, on the other hand, a construction material, which includes in its composition the aforementioned mortar, which comprises a granular material that allows the mortar content to be reduced to be able to manufacture panels, bricks and construction pieces, and where this material has suitable characteristics for this purpose, and also includes other characteristics such as improving acoustic insulation and/or behavior against fire or high temperatures. In addition, the resulting pieces obtained with the construction material of the invention do not need anchors or structures for the union of, for example, some panels with others, since this union is possible through the mortar itself.

Another advantage of the present invention is that for the manufacture of the mortar the consumption or need of water is reduced and, in addition, the granular material comes from elements that are difficult to recycle per se, such as cork and EVA or EVA rubber. One difference with respect to other known plaster mortars is that the consumption of mortar is reduced, and therefore the advantage is that the proportion of reusable granular material is increased. Another aspect to consider is that, when obtaining a product with good thermal insulation characteristics, it is also possible to reduce and optimize the energy consumption of a home or place where the pieces of this material are made. This makes the invention a more sustainable product from an environmental point of view.

SUMMARY OF THE INVENTION

The mortar object of the invention is an ecological-type binder or mass that is formed by a mixture that comprises calcium sulfate, water and a setting control additive; and, in addition, the invention also comprises a mixture with the aforementioned mortar together with at least one granular material selected from EVA, recycled cork or marble powder, which makes up the construction material of the invention.

A first aspect of the invention is to define the composition of the mortar, which comprises the following components in percentages by weight:

65-69% calcium sulphate or brown construction plaster.

29-33% water; and 0.01-0.1% setting control additive based on polycarboxylic acid.

A mortar within the above parameters has the following characteristics: 1000-1450 Kg/m$^3$ absolute density; 21.75 Kg/m$^3$ surface density, a pH of 8, and a water solubility indicator of 0.25.

When this mortar is tested, within the previously described parameters, the following results are obtained:

3.85-5.15 N/mm$^2$ bending resistance 12.90-15.20 N/mm$^2$ compression resistance; and 38-51 minutes setting time.

Taking these characteristics into account, this plaster mortar can extend its use not only to filling gaps in partitions and/or fixing or joining construction elements, as is the case with cement mortars, but, due to these better resistant characteristics, which can be obtained in a short time, can be used to erect interior partition walls. Specifically, this mortar has resistant characteristics superior to the equivalent cement M80 type mortars (according to UNE80101 standard), and practically similar to the modern M160 type cement mortars, cement, which is the category of cement mortars with maximum resistant performance.

Furthermore, in accordance with the decision of 96/603/CEE establishing the list of products classified in class A "without contribution to fire," it is classified in relation to its fire behavior as a class A1 material.

A second object of the invention is, as previously mentioned, to define a construction material based on the aforementioned mortar. This construction material is formed by the mixture between the mortar and a granular material selected from EVA, recycled cork, or marble powder; so that once the mixture has set, the resulting material has a series of mechanical properties that improve the prefabricated elements known so far in construction, both in resistance and in acoustic and thermal properties.

All these bound materials can be obtained from remains resulting from previously used waste; and, therefore, the construction material of the invention can be made up of materials reused and used for other uses, without the construction material obtained losing mechanical qualities.

Once at least one of the above materials is added to the mortar, the mixture of the resulting construction material is poured into molds where it is allowed to set, without any type of final drying procedure, and once dry it is removed and cuts into the desired length such as panels, bricks or construction pieces to be used in the execution of interior partitions, ceiling and/or wall coverings.

Another detail of the invention is that to join the different pieces obtained with the construction material of the invention, the mortar itself is used, making it unnecessary to use anchor pieces or similar, as occurs in traditional construction.

In one embodiment of the invention, the material added to the mortar is EVA, ethylene vinyl acetate or EVA rubber. This material is a petroleum derivative and its most widespread use is for the manufacture of footwear, mats, toy stores or similar. In the present invention, unusable defects, fragments or remains can be used in the manufacture of a multitude of products with said materials, where these remains or fragments are not reusable or recycled. In the case of the present invention, the EVA is used crushed, specifically in pieces with a thickness between 0.2-1.00 mm. This range of thicknesses allows for perfect mixing with the mortar, given that a higher range would have problems with wetting the whole. Once this material is crushed depending on the final finish intended for the panel, brick or construction piece to be formed; This material is added to the previously mentioned mortar.

The construction material obtained by mixing the mortar, according to the invention, and the crushed EVA material has a weight ratio of mortar and EVA of 3:7, where the EVA has granules with a thickness between 0.2-1.00 mm.

Once the mortar composition is mixed with EVA, and is also set and cut, the construction material has high fireproof, ecological, insulating properties, both noise and thermal, and even anti-seismic.

Specifically, in tests it has been determined in a series of samples of masonry blocks executed according to the previous dosage, where the flexural resistance is between 1.15 and 160 N/mm$^2$ and the compression resistance is between 2.00 and 2.20 N/mm$^2$. These values allow us to affirm that they comply with the minimum compressive strength for this type of blocks, which is 2 N/mm$^2$.

Tests are also carried out for samples of panels executed according to the previous dosage, where the bending resistance is between 5.20 and 5.95 N/mm$^2$, and the compression resistance is between 12.55 and 17.40 N/mm$^2$. These values allow us to affirm that meet the minimum compression resistance for this type of panels, which is 5 N/mm$^2$.

This compound, made both in blocks or pieces and in coated panels, has been studied to be capable of withstanding incident frequencies between 4800 and 4900 Hz, and, therefore, it can be stated that it achieves acoustic insulation between 50 and 65 dB. As an example, in a panel 8 to 10 cm thick according to a dosage as previously described, an acoustic insulation of 50 dB is obtained, while with a conventional panel of similar thickness the acoustic insulation is 35 dB. This compound, in terms of resistance to high intensity fires, is classified as A1, since it can withstand more than 2 hours at temperatures of 1000° C.

Thus, with the construction material resulting from the mixture between the mortar and the EVA, panels, bricks, and construction pieces are obtained, which are used for the execution of interior partitions, ceiling and/or wall coverings with improved mechanical properties comparable to cement-based mortars, and ceramic or concrete pieces. In addition, they allow the creation of healthy environments where good acoustic and thermal insulation is ensured.

In another possible embodiment of the invention, the material added to the mortar is cork. This material is obtained from the trunks of trees and its most widespread use is for the manufacture of plugs. In the case of the present invention, the cork can be recycled, coming from remains or leftovers from the industry related to cork, and where these remains are crushed, specifically into granules with a thickness between 0.1-1.0 mm. This range of thicknesses allows for perfect mixing with the mortar, given that a higher range would have problems with wetting the whole. Once this material is granulated, and with its granulometry depending on the final finish intended for the panel, brick or construction piece to be formed, this material is added to the previously mentioned mortar.

The construction material obtained by mixing the mortar, according to the invention, and the recycled cork granulated material has a proportion of mortar and cork of 4:6, where the cork has granules of thickness between 0.1-1.0 mm.

For all these reasons, once this mixture of mortar and cork has been made, as well as set and cut, the construction material obtained has high fireproof properties, ecological properties, insulating properties, both noise and thermal, and even anti-seismic properties.

Specifically, in tests it has been determined in a series of samples of masonry blocks executed according to the previous dosage, where the flexural resistance is between 1.45 and 1.65 N/mm$^2$, the compressive resistance is between 2.75 and 3.05 N/mm$^2$. These values allow us to affirm that they comply with the minimum compressive strength for this type of blocks, which is 2 N/mm$^2$.

Tests are also carried out for samples of panels executed according to the previous dosage, where the bending resistance is between 6.25 and 6.40 N/mm$^2$, and the compression resistance is between 16.95 and 19.25 N/mm$^2$. These values allow us to affirm that they comply with the minimum compression resistance for this type of panels, which is 5 N/mm$^2$.

This compound, executed both in blocks or pieces and in coated panels, is studied to be capable, as for the previous embodiment, to withstand incident frequencies of between 4800 and 4900 Hz, and, therefore, it can be stated that it reaches an acoustic insulation between 50 and 65 dB. As an example, in a panel 8 to 10 cm thick according to a dosage as previously described, an acoustic insulation of 50 dB is obtained, while with a conventional panel of similar thickness the acoustic insulation is 35 dB. This compound in terms of resistance to high intensity fires, it is classified as A1, since it can withstand more than 2 hours at temperatures of 1000° C.

Thus, with the construction material resulting from the mixture between mortar and cork, panels, bricks and construction pieces are obtained, which are used for the execution of interior partitions, ceiling and/or wall coverings, with mechanical and acoustic properties, and comparable, and even improved, thermal properties compared to other conventional products.

In a third embodiment of the invention, the material added to the mortar is marble powder. This material is obtained as waste material in marble quarries and its most widespread use is for priming fabric surfaces or other surfaces intended for painting. In the case of the present invention, marble powder is used in its natural state. Thus, the construction material obtained by mixing the mortar, according to the invention, and the marble powder has a proportion of mortar and marble powder of 3 m$^3$:1 m$^3$.

For all these reasons, once this mixture of mortar and marble powder has been set, the construction material obtained has a high value in hardness and resistance, so that this mixture can be used to make floors and can even be used as glue in liquid state. Specifically, in tests it has been determined in a series of samples of masonry blocks executed according to the previous dosage, where the bending resistance is between 2.99 and 3.57 N/mm$^2$. These values allow us to affirm that they meet the bending resistance above the values of the previous realizations, which implicitly leads to the compression resistance being above 2 N/mm$^2$.

Finally, it is indicated that the pieces manufactured with said construction material, whether pieces, brick-type blocks or construction panels, can be fixed to each other and/or coated with the previously defined mortar.

It must be considered that, throughout the description and claims, the term includes and its variants are not intended to exclude other technical characteristics or additional elements, and the description must be taken in a broad and non-limiting sense, as well as the description of the possible ways of putting it into practice.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
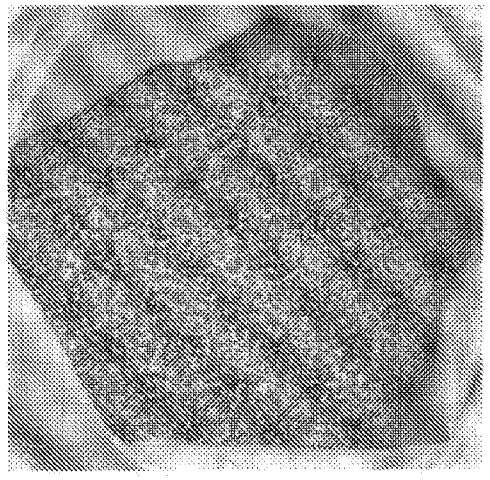
FIG. 1 shows an image of crushed remains of EVA or EVA rubber.

As previously mentioned, a first aspect of the invention is to define the composition of a possible embodiment of mortar with the following components in percentages by weight:

- 67.97% calcium sulfate;
- 31.98% water; and
- 0.05% setting control additive based on polycarboxylic acid.

This mortar, for a thickness of 1.5 cm, has 1280 Kg/m$^3$ of absolute density; and 21.75 Kg/m$^3$ of surface density, with a pH of 8 and a water solubility value of 0.25.

A series of test specimens is made with a mortar according to the previous dosage to determine the bending resistance of said material. Table 1 shows the results:

TABLE 1

| Test Subject | Length (mm) | Width (mm) | Thickness (mm) | Breaking Load (N) | Bending Resistance (MPa) |
|---|---|---|---|---|---|
| 1 | 160.2 | 40.2 | 40.4 | 1908 | 4.50 |
| 2 | 160.2 | 40.3 | 41.5 | 1643 | 3.85 |
| 3 | 160.1 | 40.3 | 40.8 | 1954 | 4.60 |
| 4 | 160.4 | 40.3 | 40.1 | 1993 | 4.70 |
| 5 | 160.3 | 40.0 | 40.2 | 2185 | 5.15 |
| 6 | 160.2 | 40.0 | 39.8 | 2118 | 5.00 |

The determination is carried out in accordance with UNE-EN13279-2:2014, with the breakage of the specimens being 7 days after curing in the test atmosphere conditions indicated in section 3.1 of the aforementioned standard.

The average bending resistance result is 4.63 $N/mm^2$.

A series of test specimens are made with a mortar according to the previous dosage to determine the compressive strength of said material. Table 2 shows the results:

TABLE 2

| Test Subject | | Length (mm) | Width (mm) | Thick-ness (mm) | Breaking Load (N) | Compression Resistance (MPa) |
|---|---|---|---|---|---|---|
| 1 | 1.1 | 75.1 | 40.2 | 40.4 | 20590 | 12.90 |
| | 1.2 | 96.2 | 40.2 | 40.3 | 20784 | 13.00 |
| 2 | 2.1 | 94.4 | 40.3 | 40.4 | 21680 | 13.60 |
| | 2.2 | 83.7 | 40.2 | 40.3 | 22106 | 13.85 |
| 3 | 3.1 | 81.2 | 40.2 | 40.3 | 21435 | 13.40 |
| | 3.2 | 88.0 | 40.2 | 40.5 | 22267 | 13.95 |
| 4 | 4.1 | 78.4 | 40.1 | 39.9 | 24303 | 15.20 |
| | 4.2 | 84.8 | 40.3 | 40.5 | 22564 | 14.15 |
| 5 | 5.1 | 76.4 | 40.1 | 40.0 | 22287 | 13.95 |
| | 5.2 | 87.4 | 40.1 | 40.5 | 21660 | 13.55 |
| 6 | 6.1 | 75.6 | 40.1 | 39.7 | 23608 | 14.80 |
| | 6.2 | 87.2 | 40.2 | 40.3 | 20357 | 12.75 |

1 The determination is carried out in accordance with UNE-EN13279-2:2014, with the breakage of the specimens being 7 days after curing in the test atmosphere conditions indicated in section 3.1 of the aforementioned standard.

The average flexural strength result is 13.78 $N/mm^2$. It can be seen that the average of the product allows us to obtain a mortar with resistance characteristics superior to the equivalent type M80 cement mortars, and even, in some specimens, resistances practically similar to the type M160 cement mortars are achieved, which is the category of cement mortars with maximum resistant performance.

Two values are also obtained for determining the setting time, carried out following the UNE-EN13279 standard and according to the knife method. The values obtained are 51 minutes and 38 minutes, and an average setting time of 44 minutes can be determined. This indicates that a mortar executed according to the previous dosage obtains resistant values in a short period of less than 45 minutes.

Also, as previously mentioned, a second aspect of the invention is to define a construction material from said mortar. This construction material is formed by mixing mortar and a granular material selected from EVA, recycled cork, or marble powder.

In a possible embodiment of the invention, the material added to the mortar is EVA, ethylene vinyl acetate or EVA rubber. This material is used crushed, and allows the reuse of remains of this material that in normal use is neither reusable nor recyclable. See FIG. 1. The construction material has a weight ratio of mortar and EVA of 3:7, where the EVA has 0.5 mm thick granules.

Figure 2:
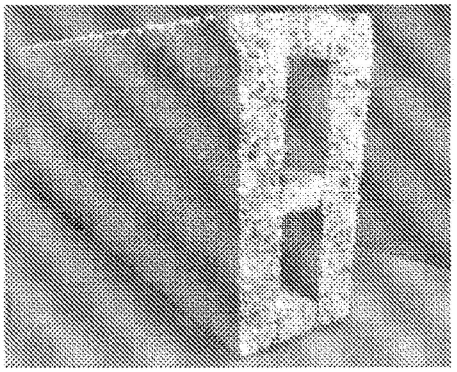
FIG. 2 shows a perspective image of a brick-shaped block in which the material added to the mortar is EVA.

A series of test specimens are made with a sample of a brick-type construction block according to the previous dosage (see FIG. 2) to determine the bending resistance of said block. Table 3 shows the results:

TABLE 3

| Test Subject | Length (mm) | Width (mm) | Thickness (mm) | Breaking Load (N) | Bending Resistance (MPa) |
|---|---|---|---|---|---|
| 1 | 160.3 | 40.8 | 39.1 | 503 | 1.20 |
| 2 | 160.2 | 41.5 | 40.1 | 485 | 1.15 |
| 3 | 160.6 | 41.3 | 41.6 | 526 | 1.25 |

The determination is carried out according to UNE-EN13279-2:2014, with the breakage of the specimens being 28 days after curing at room temperature.

The average bending resistance result is 1.20 $N/mm^2$.

A series of test tubes is made with a sample of a block according to the previous dosage to determine the compressive strength of said block. Table 4 shows the results:

TABLE 4

| Test Subject | | Length (mm) | Width (mm) | Thick-ness (mm) | Breaking Load (N) | Compression Resistance (MPa) |
|---|---|---|---|---|---|---|
| 1 | 1.1 | 84.6 | 41.0 | 39.9 | 3152 | 2.10 |
| | 1.2 | 84.9 | 41.0 | 39.6 | 2812 | 2.00 |
| 2 | 2.1 | 83.3 | 41.1 | 40.1 | 2896 | 2.00 |
| | 2.2 | 81.7 | 42.0 | 40.3 | 3306 | 2.20 |
| 3 | 3.1 | 78.7 | 40.1 | 41.7 | 3167 | 2.15 |
| | 3.2 | 85.6 | 41.6 | 40.6 | 3093 | 2.05 |

The determination is carried out according to UNE-EN13279-2:2014, with the breakage of the specimens being 28 days after curing at room temperature.

The average bending resistance result is 2.06 $N/mm^2$. It can be seen that the average of the product allows us to obtain a block with resistance greater than 2 $N/mm^2$, the minimum for this type of construction parts.

Figure 3:
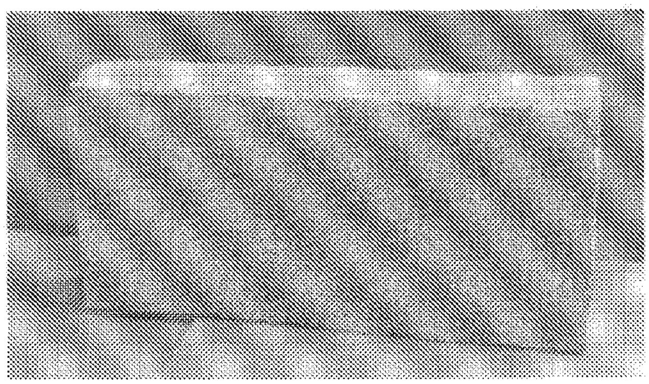
FIG. 3 shows a perspective image of a plate where the material added to the mortar is EVA.

Tests are also carried out for some samples of a panel executed according to the previous dosage (see FIG. 3), to determine the bending resistance of said panel. Table 5 shows the results:

TABLE 5

| Test Subject | Length (mm) | Width (mm) | Thickness (mm) | Breaking Load (N) | Bending Resistance (MPa) |
|---|---|---|---|---|---|
| 1 | 160.2 | 40.3 | 40.2 | 2205 | 5.20 |
| 2 | 160.6 | 40.7 | 41.0 | 2524 | 5.95 |
| 3 | 160.7 | 41.1 | 40.9 | 2373 | 5.60 |

The determination is carried out according to UNE-EN13279-2:2014, with the breakage of the specimens being 28 days after curing at room temperature.

The average bending resistance result of the aforementioned panel is 5.60 $N/mm^2$.

A series of test tubes is made with a sample of a panel according to the previous dosage to determine the compression resistance of said panel. Table 6 shows the results:

TABLE 6

| Test Subject | | Length (mm) | Width (mm) | Thick-ness (mm) | Breaking Load (N) | Compression Resistance (MPa) |
|---|---|---|---|---|---|---|
| 1 | 1.1 | 84.2 | 39.8 | 40.3 | 27835 | 17.40 |
| | 1.2 | 84.3 | 40.0 | 40.2 | 25669 | 16.05 |
| 2 | 2.1 | 79.8 | 40.6 | 40.6 | 23381 | 14.65 |
| | 2.2 | 89.0 | 40.5 | 40.7 | 27867 | 17.45 |
| 3 | 3.1 | 76.4 | 41.6 | 40.7 | 27581 | 17.25 |
| | 3.2 | 89.8 | 40.5 | 41.1 | 20079 | 12.55 |

The determination is carried out according to UNE-EN13279-2:2014, with the breakage of the test pieces being 28 days after curing at room temperature.

The average compressive strength result is 15.9 $N/mm^2$. It can be seen that the average of the product allows us to obtain a panel with resistance greater than 5 $N/mm^2$, the minimum for this type of construction elements.

Figure 4:
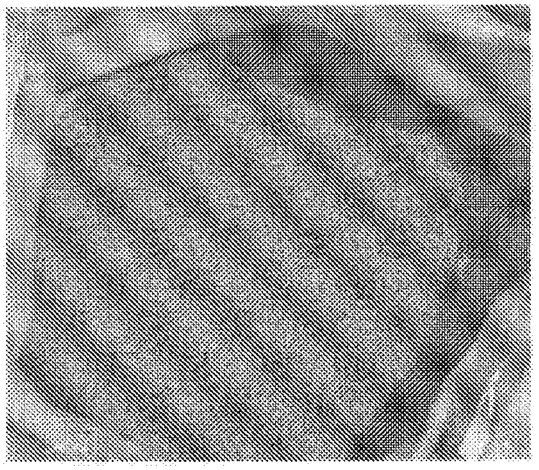
FIG. 4 shows an image of crushed cork remains.

In another possible embodiment of the invention, the material added to the mortar is cork. This material is used crushed, and allows the use of remains of this material left over from the industry related to cork. See FIG. 4. The construction material has a weight ratio of mortar and cork of 4:6, where the cork is made up of 0.5 mm thick granules.

Figure 5:
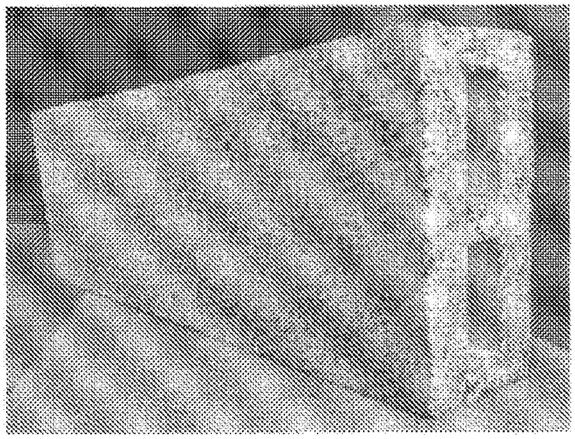
FIG. 5 shows a perspective image of a brick-shaped block in which the material added to the mortar is cork.
Figure 6:
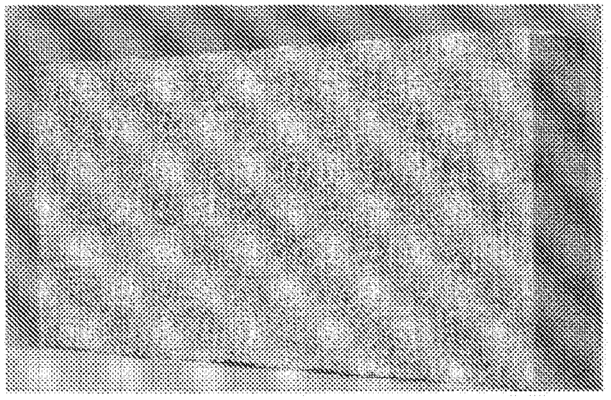
FIG. 6 shows a perspective image of a plate where the material added to the mortar is cork.

A series of test specimens are made with a sample of a brick-type construction block according to the previous dosage (see FIG. 5) to determine the bending resistance of said block. Table 7 shows the results:

TABLE 7

| Test Subject | Length (mm) | Width (mm) | Thickness (mm) | Breaking Load (N) | Bending Resistance (MPa) |
|---|---|---|---|---|---|
| 1 | 160.0 | 40.1 | 41.5 | 678 | 1.60 |
| 2 | 159.9 | 40.0 | 41.3 | 614 | 1.45 |
| 3 | 160.0 | 40.2 | 41.3 | 691 | 1.65 |

The determination is carried out according to UNE-EN13279-2:2014, with the breakage of the specimens being 28 days after curing at room temperature.

The average bending resistance result is 1.60 N/mm$^2$.

A series of test tubes is made with a sample of a block according to the previous dosage to determine the compression resistance of said block. Table 8 shows the results:

TABLE 8

| Test Subject | | Length (mm) | Width (mm) | Thick-ness (mm) | Breaking Load (N) | Compression Resistance (MPa) |
|---|---|---|---|---|---|---|
| 1 | 1.1 | 78.2 | 42.7 | 40.0 | 4872 | 3.05 |
| | 1.2 | 85.8 | 40.4 | 40.0 | 4815 | 3.05 |
| 2 | 2.1 | 78.3 | 41.8 | 40.1 | 4359 | 2.75 |
| | 2.2 | 83.7 | 40.4 | 40.1 | 4703 | 2.95 |
| 3 | 3.1 | 79.3 | 40.5 | 40.1 | 4603 | 2.90 |
| | 3.2 | 83.1 | 42.0 | 40.1 | 4600 | 2.90 |

The determination is carried out according to UNE-EN13279-2:2014, with the breakage of the specimens being 28 days after curing at room temperature.

The average flexural strength result is 2.9 N/mm$^2$. It can be seen that the average of the product allows us to obtain a block with resistance greater than 2 N/mm$^2$, the minimum for this type of constrictive pieces.

Tests are also carried out for some samples of a panel executed according to the above dosage (see FIG. 8), to determine the flexural resistance of said panel. Table 9 shows the results:

TABLE 9

| Test Subject | Length (mm) | Width (mm) | Thickness (mm) | Breaking Load (N) | Bending Resistance (MPa) |
|---|---|---|---|---|---|
| 1 | 160.2 | 40.3 | 40.2 | 2205 | 5.20 |
| 2 | 160.6 | 40.7 | 41.0 | 2524 | 5.95 |
| 3 | 160.7 | 41.1 | 40.9 | 2373 | 5.60 |

The determination is carried out according to UNE-EN13279-2:2014, with the breakage of the specimens being 28 days after curing at room temperature.

The average bending resistance result of the aforementioned panel is 5.60 N/mm$^2$.

A series of test tubes is made with a sample of a panel according to the previous dosage to determine the compression resistance of said panel. Table 10 shows the results:

TABLE 10

| Test Subject | | Length (mm) | Width (mm) | Thick-ness (mm) | Breaking Load (N) | Compression Resistance (MPa) |
|---|---|---|---|---|---|---|
| 1 | 1.1 | 77.4 | 40.6 | 41.2 | 28822 | 18.05 |
| | 1.2 | 85.4 | 40.2 | 41.0 | 30736 | 19.25 |
| 2 | 2.1 | 76.9 | 39.9 | 40.9 | 27076 | 16.95 |
| | 2.2 | 84.7 | 39.5 | 41.2 | 30103 | 18.85 |
| 3 | 3.1 | 75.9 | 40.8 | 41.2 | 29620 | 18.55 |
| | 3.2 | 85.7 | 40.7 | 40.9 | 27580 | 17.25 |

The determination is carried out according to UNE-EN13279-2:2014, with the breakage of the specimens being 28 days after curing at room temperature.

The average compressive strength result is 18.2 N/mm$^2$. It can be seen that the average of the product allows us to obtain a panel with resistance greater than 5 N/mm$^2$, the minimum for this type of construction elements.

In another possible embodiment of the invention, the material added to the mortar is marble powder. This material is obtained as waste material in marble quarries where the construction material has a proportion of mortar and marble powder of 3 m$^3$:1 m$^3$.

A series of test specimens are made with a sample of a brick-type construction block according to the previous dosage to determine the bending resistance of said block. Table 11 shows the results:

TABLE 11

| Test Subject | Length (mm) | Width (mm) | Thickness (mm) | Breaking Load (N) | Bending Resistance (MPa) |
|---|---|---|---|---|---|
| 1 | 160.0 | 39.78 | 37.07 | 1041 | 3.56 |
| 2 | 160.0 | 38.52 | 41.33764 | 1194 | 3.28 |
| 3 | 160.0 | 39.69 | 41.33924 | 1455 | 3.57 |
| 4 | 160.0 | 39.46 | 36.99 | 1261 | 3.50 |
| 5 | 160.0 | 37.48 | 39.82 | 1264 | 3.19 |
| 6 | 160.0 | 39.79 | 40.50 | 1522 | 3.50 |
| 7 | 160.0 | 40.48 | 39.42 | 1445 | 3.45 |
| 8 | 160.0 | 39.88 | 39.42 | 1296 | 3.14 |
| 9 | 160.0 | 39.31 | 36.91 | 1141 | 3.20 |
| 10 | 160.0 | 40.07 | 39.73 | 1412 | 3.35 |
| 11 | 160.0 | 39.26 | 37.96 | 1129 | 2.99 |
| 12 | 160.0 | 39.10 | 38.19 | 1163 | 3.06 |

The determination is made according to UNE-EN13279-2:2014. The average flexural strength result is 3.32 N/mm$^2$, already higher than the minimum values for compressive strength of 2 N/mm$^2$, and also higher than the values obtained in some of the previous tests. Additionally, average density values of 1546.50 Kg/m$^3$ are obtained.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A construction material preparation comprising:

a mortar preparation, said mortar preparation comprising:

65-69% by weight of calcium sulfate;

29-33% by weight of water;

0.01-0.1% by weight of a setting control additive, said setting control additive comprising polycarboxylic acid;

wherein said mortar preparation has an absolute density of 1000-1450 $Kg/m^3$;

wherein said mortar preparation has a surface density of 21.75 $Kg/m^3$;

a granular material mixed with said mortar preparation to define a settable mixture;

wherein said granular material comprises crushed ethyl vinyl acetate fragments;

wherein said settable mixture is characterized by a weight ratio of said mortar preparation to said crushed ethyl vinyl acetate fragments of 3:7;

wherein said crushed ethyl vinyl acetate fragments comprise a plurality of granules each having a thickness of between 0.20-1.00 mm;

wherein said crushed ethyl vinyl acetate fragments are wetted by said mortar preparation in said settable mixture;

wherein said settable mixture is configured to be poured into a mold and allowed to set without a final drying procedure to form a construction piece selected from a panel, a brick, or a construction block; and wherein said construction piece is configured to be joined to another construction piece using said mortar preparation without a separate anchoring structure.

* * * * *